July 9, 1940.     G. W. BRUDERICK     2,207,114
SIGNAL SYSTEM FOR MOTOR-DRIVEN VEHICLES
Filed Nov. 7, 1938
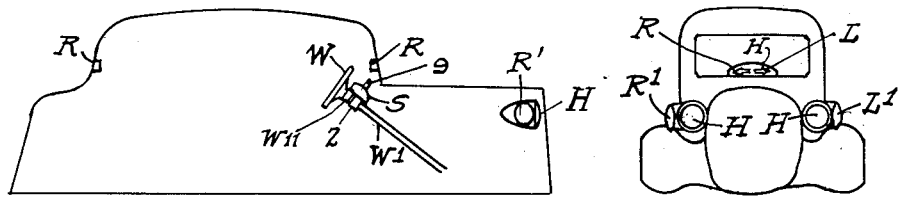
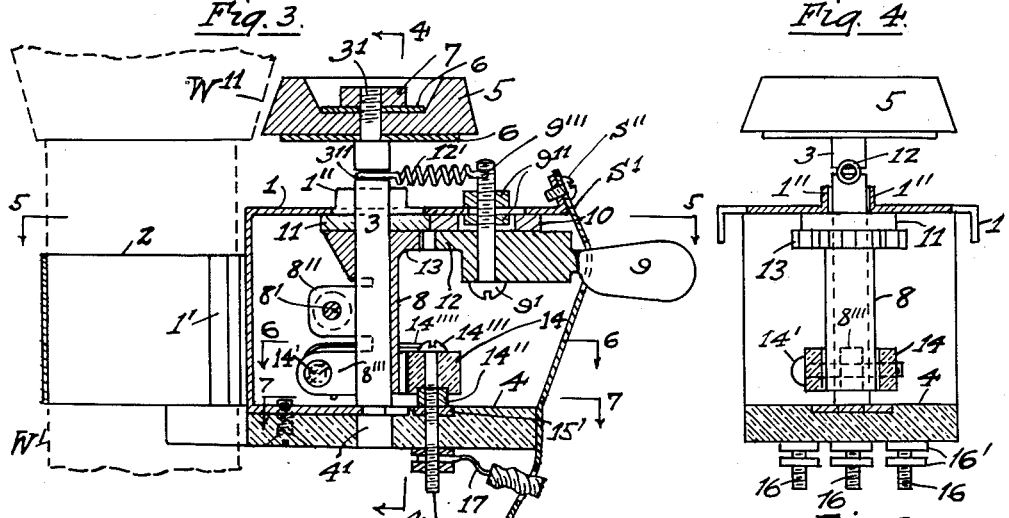
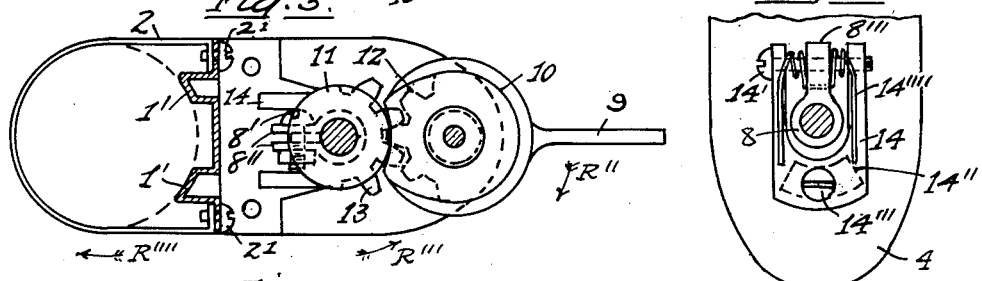
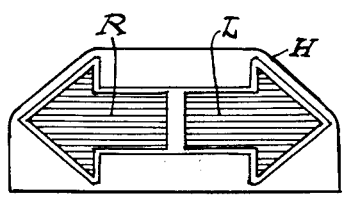
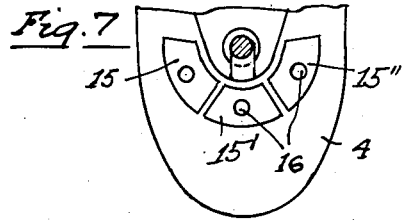
Inventor:—
George W. Bruderick Patented July 9, 1940

2,207,114

UNITED STATES PATENT OFFICE 2,207,114

SIGNAL SYSTEM FOR MOTOR-DRIVEN VEHICLES

George W. Bruderick, Detroit, Mich.

Application November 7, 1938, Serial No. 239,248

3 Claims. (Cl. 200—59)

My invention relates to improvements in signal systems for motor-driven vehicles, and its principal object is to provide signalling means for right and left hand turns which are put into operation manually prior to the turning of the steering wheel, and which are automatically returned to their inoperative positions when the steering wheel is moved back to its middle or straight-away position.

Another object of my invention is to provide supplementary lights which are positioned in or near the front of the vehicle on either side and operated simultaneously with the right and left hand turn signals, whereby a light is projected lateraly so as to illuminate the road in the direction in which it is intended to turn and also to be visible to drivers approaching from that direction.

A further object of my said invention is to provide an improved switch for signal systems of the character recited and which is simple in construction, reliable in operation, and which can be easily and quickly adjusted to suit the convenience of the different operators.

With these and other objects in view, I will now describe a preferred embodiment of my invention, reference being had to the accompanying drawing, in which—

Figure 1 is a diagrammatical side elevation showing locations of the various elements of the system.

Figure 2 is a diagrammatical front elevation of the same.

Figure 3 is a vertical sectional elevation showing one construction of my improved switch in detail.

Figure 4 is a vertical sectional view taken on line 4—4 of Figure 3.

Figure 5 is a horizontal sectional view taken on line 5—5 of Figure 3 showing the manual operating means.

Figure 6 is a similar section take on line 6—6 of Figure 3 showing the movable switch arm.

Figure 7 is a similar view taken on line 7—7 of Figure 3 showing the arrangement of the fixed contact members of the switch.

Figure 8 is a front elevation showing one construction of the signal lamp to be used with my system.

Like characters designate corresponding parts throughout the several views.

Referring more particularly to Figures 1 and 2 of the drawing, R and L designate the right and left hand signals, respectively, which are in the present example located in front and rear inside the vehicle so as to be visible through the windshield and the rear window, respectively, as will be understood.

R' and L' indicate supplementary turning lights which are here shown as being incorporated with the regular headlights H but which may be constructed as separate units and located upon the fenders or in any desired position. W is the steering wheel mounted upon the usual pillar W' while S indicates the operating switch which is so mounted upon the said pillar as to be adjustable to suit the convenience of the operator, as above stated.

Referring now to Figures 3 to 7, inclusive, 1 is a bracket formed from sheet steel or other suitable material having concave portions 1' adapted to fit against the upper surface of the pillar W' and secured in position by a U-shaped clamp member 2 and screws 2'. Rotatably mounted upon the bracket 1 is a shaft 3, the lower end of which is loosely supported in a bearing 4' in the fiber block 4 secured to the bracket, while the upper end is so arranged as to be slidably and rotatably supported between upwardly projecting ears 1" formed integral with the upper portion of the bracket. Upon the upper extremity of the shaft 3 is mounted a wheel 5, of rubber or other resilient material which is bored to fit the reduced portion 3' of the shaft and is clamped tightly in position between metal washers 6 and by the nut 7 as shown more clearly in Figure 3. Intermediate the upper and lower horizontal members of the bracket 1 is a sleeve 8 which is maintained in frictional driving relation with the shaft 3 by means of a bolt 8' which serves to draw the projecting ears or lugs 8" together so as to produce the desired amount of friction.

Pivotally secured to the upper member of the bracket 1 as by a screw 9' and nuts 9" is the manually operated lever 9, and upon the upper face of this lever is mounted a cam 10 which is maintained in co-operative relation with the cam roller 11, upon the sleeve 8, by means of the helical tension spring 12', one end of which engages a reduced portion 3" in the shaft 3 while the other end is formed with a hooked portion adapted to engage the hole 9''' in the screw 9'. Upon the lever 9 is also a segmental gear 12, the teeth of which engage a similar gear 13 formed integral with or secured to the sleeve 8, the arrangement being such that when the lever 9 is rotated in one direction or the other about its pivotal screw 9' the sleeve 8 will also be rotated due to the action of the gears 12, 13, and the upper end of the shaft 3 will thus be moved, against the action of the spring 12, in a direction away from the lever 9 through the action of the cam 10 upon the roller 11. Such movement of the lever 9 will bring the beveled periphery of the wheel 5 into frictional engagement with the hub W''' of the steering wheel, so that movement of the latter in one direction or the other will cause rotation of the shaft 3.

Pivotally mounted upon a lug 8''' by means of the screw 14' is a switch arm 14, of fiber or other insulating material which carries upon its lower face a contact member 14'' secured in position by means of a screw 14''' which threadedly engages it. Radially disposed upon the upper surface of the fiber block 4 are the contact members 15, 15' and 15'', each secured in position by screws 16 which project directly below the underside of the block and are provided with nuts 16' between which are clamped the connecting wires 17 in the manner well known in the art. The switch arm 14 is yieldingly pressed downwards by means of the mouse trap type spring 14'''', secured in position by the screw 14' so as to maintain the contact member 14'' in frictional engagement with one or more of the contact members 15, 15', 15'', following the conventional switch construction.

The contact member 15 is connected to the bulbs of the left hand signal and turning lights L and L' and the member 15'' to those of the right hand lights R and R', while the center contact member 15' is connected to the source of current supply as by the ammeter terminal. Switch means may be inserted in the circuits for cutting out the turning lights R', L' during the daytime. All of these connections are so common in the art that no further explanation is deemed necessary.

A housing S', attached to the frame 1 by screws as shown at S'', serves to protect the mechanism of the switch from dirt and injury. The right and left hand signals, as shown in Figures 2 and 8, consist essentially of a housing H having arrow-shaped perforations R and L each having a separate light bulb behind it in the conventional manner. Glass panes of any desired color, such as amber, cover the perforations.

The operation of the switch mechanism is as follows:

Assuming that the steering wheel is in the middle or straight-away position and the operator intends to make a right hand turn, he first moves the lever 9 in the direction indicated by the arrow R'' in Figure 5, which causes the sleeve 8 and with it the frictionally driven shaft 3 to rotate in the opposite direction as indicated by the arrow R''' until the segmental gears 12, 13 arrive at their locked positions, at which time the contact member 14'' of the switch arm 14 is in a position to bridge the contact members 15', 15'' and thus energizing the bulbs of the lights R and R'.

This movement of the lever 9 also, through the action of the cam 10 upon the roller 11, causes the wheel 5 to come into frictional contact with the hub W'' of the steering wheel, so that when the latter is operated, at the proper time, to make the right hand turn, the wheel 5 and the shaft 3 are rotated as indicated in the direction of the arrow R''' and, since the gears 10, 11 are at the extreme limit of their movement, the shaft 3 turns within the sleeve 8, the friction between them being overcome by the torque imparted to the wheel 5.

The lights R and R' therefore continue to function until the operator turns the steering wheel back to the middle position, when the rotation of the wheel 5 and shaft 3 in the opposite direction to the arrow R3 brings the contact member 14'' of the switch to the central or cut-out position.

While I have herein described and shown a preferred embodiment of my invention, it will be readily understood by those skilled in the art to which the same pertains, that various changes in detail may be made to suit any particular or peculiar requirement, without departing from the spirit of my invention as defined in the appended claims.

Having thus described my said invention, what I claim and desire to secure by Letters Patent of the United States is:

1. In a signal system for automobiles, the combination, with a steering wheel having a hub, of a switch comprising a frame, a shaft rotatably and inclinably mounted upon said frame, a sleeve upon said shaft and arranged in frictional driving relation therewith, a gear fixed upon said sleeve, a second gear meshing with said first-mentioned gear pivoted to said frame and having a handle for manual rotation, a switch arm pivoted upon said sleeve and having a contact member, a plurality of fixed contact members upon said frame arranged in cooperative relation with said first-mentioned contact member, a wheel fixed to said shaft and positioned proximate to said steering wheel hub, and cam means upon said handle adapted to force said wheel into frictional engagement with said hub when said handle is moved to one side or the other of its median position.

2. In a signal system for automobiles, the combination, with a steering wheel having a hub, of a switch comprising a frame, a shaft rotatably and inclinably mounted upon said frame, a sleeve upon said shaft and arranged in frictional driving relation therewith, a gear fixed upon said sleeve, a second gear meshing with said first-mentioned gear pivoted to said frame and having a handle for manual rotation, a switch arm pivoted upon said sleeve and having a contact member, a plurality of fixed contact members upon said frame arranged in cooperative relation with said first-mentioned contact member, a wheel fixed to said shaft and positioned proximate to said steering wheel hub, cam means upon said handle adapted to force said wheel into frictional engagement with said hub when said handle is moved to one side or the other of its median position, means for limiting the angular movement of said handle, and spring means for normally maintaining said wheel out of engagement with said hub.

3. In a signal system for automobiles, the combination, with a steering mechanism having fixed and movable elements, of a switch comprising a shaft rotatably mounted upon said fixed element, a switch member arranged in frictional driving relation with said shaft, a plurality of fixed contacts adapted to co-act with said switch member, stop means for limiting the movement of said switch member, a wheel upon said shaft positioned proximate said movable element, manual means for operating said switch member to close a circuit and for simultaneously forcing said wheel into frictional engagement with said movable element, and means for disengaging said wheel from said movable element when said switch member is returned to open-circuit position.

GEORGE W. BRUDERICK.